(12) United States Patent
Borac

(10) Patent No.: US 8,705,537 B1
(45) Date of Patent: Apr. 22, 2014

(54) EVENTUALLY-CONSISTENT DATA STREAM CONSOLIDATION

(76) Inventor: Andrei Teodor Borac, Pacifica, CA (US)

( * ) Notice: Subject to any disclaimer, the term of this patent is extended or adjusted under 35 U.S.C. 154(b) by 181 days.

(21) Appl. No.: 13/492,914

(22) Filed: Jun. 10, 2012

(51) Int. Cl.
*H04L 12/28* (2006.01)

(52) U.S. Cl.
USPC .......................................................... 370/394

(58) Field of Classification Search
USPC ............ 370/394, 389, 471, 412, 413, 395.71, 370/395.7, 428, 432, 474, 473, 312, 349; 709/224, 232, 247; 714/2, 15
See application file for complete search history.

(56) References Cited

U.S. PATENT DOCUMENTS

| | | | |
|---|---|---|---|
| 5,434,994 A | | 7/1995 | Shaheen et al. |
| 5,586,247 A | * | 12/1996 | Yoshifuji et al. .................. 714/2 |
| 5,588,147 A | | 12/1996 | Neeman et al. |
| 6,557,111 B1 | | 4/2003 | Theimer et al. |
| 6,799,190 B1 | | 9/2004 | Boothby |
| 6,967,930 B2 | * | 11/2005 | Burmeister et al. .......... 370/253 |
| 7,500,020 B1 | | 3/2009 | Kabra et al. |

OTHER PUBLICATIONS

Douglas B. Terry, Marvin M. Theimer, Karin Petersen, Alan J. Demers, Mike J. Spreitzer and Carl H. Hauser, Managing Update Conflicts in Bayou, a Weakly Consistent Replicated Storage System, Proceedings of the fifteenth ACM symposium on Operating systems principles, Dec. 3-6, 1995, pp. 172-182, ACM New York, NY, USA.
Anne-Marie Bosneag and Monica Brockmeyer, A Formal Model for Eventual Consistency Semantics, International Conference on Parallel and Distributed Computing and Systems, PDCS 2002, Nov. 4-6, 2002, pp. 204-209, IASTED/ACTA Press, Calgary, Alberta, Canada.

* cited by examiner

*Primary Examiner* — Chi Pham
*Assistant Examiner* — Alexander O Boakye

(57) ABSTRACT

One embodiment of a computer-implemented method for eventually-consistent data stream consolidation comprises associating an application-generated undo record with each packet and supplying undo records to the application in order to rewind the application state prior to effecting a merge operation on the packet stream. Other embodiments are described.

17 Claims, 2 Drawing Sheets

EVENTUALLY-CONSISTENT DATA STREAM CONSOLIDATION

CROSS-REFERENCE TO RELATED APPLICATIONS

Not Applicable

FEDERALLY SPONSORED RESEARCH OR DEVELOPMENT

Not Applicable

JOINT RESEARCH AGREEMENT

Not Applicable

COMPUTER PROGRAM LISTING

This application incorporates, as a part of it, a computer program listing appendix which is present in the file named PROG.TXT, which was created on May 27, 2012, and which was last modified on Jun. 10, 2012, and which is 9470 bytes in size.

The aforementioned program listing illustrates one possible manner of implementing portions of embodiments disclosed. It is provided as a demonstration of functionality and to allow software engineers to readily appreciate some of the advantages of the method. It is not intended for the invention to be limited to any specificities that may be contained in the program listing. The program listing is written in the Ruby programming language, and was tested in the Ruby environment provided by the Ruby interpreter version "ruby 1.8.7 (2010 Aug. 16 patchlevel 302) [x86_64-linux]".

BACKGROUND

1. Field

This application relates to low-level data storage and data transfer systems such as form the back-ends of databases and filesystems or provide a storage platform directly for computer applications.

2. Prior Art

In order to provide a foundation for useful computer applications and business logic (hereafter generically termed "application logic"), computer systems must fulfill the requirement of storing and retrieving data. Researchers in this field have identified and named several universal requirements of data storage systems. "Durability" is the fundamental requirement that the storage system not lose data. "Availability" is the requirement that the storage system be at all times capable of retrieving data within a reasonable timeframe ("read-available"), and of accepting new data for storage ("write-available"). It is widely recognized that providing durability and availability requires storing data on multiple computer systems, since any single computer system, however well designed, is susceptible to failure of a hardware component (such as a hard disk drive).

One possible arrangement, known in the prior art as a "gossip"-based method, is to have pairs of computer systems also known as "nodes" of the network) continuously transfer new data. In such an arrangement, data newly introduced at any node "diffuses" through the system until it is stored on all nodes.

In such schemes, a node may operate either as a receiver or a sender or operate in both modes simultaneously in the same interaction. The receiver is the node that is attempting to obtain new data and the sender is the node that is supplying new data.

Nodes may engage in logically independent transfers with multiple different peer nodes at the same time. Such transfers are said to be "contemporaneous".

Such schemes continuously attempt to determine, for particular pairs of nodes, or for all pairs of nodes, which of the items of data a first node has in storage are not present on a second node and vice versa. After each node sends data that the other is missing, the nodes are in synchrony (assuming that neither node was engaged in a contemporaneous transfer with a third node).

Many such schemes permit contemporaneous transfers amid a steady influx of new data, with the result that synchrony of all nodes, or even a particular pair of communicating nodes, is rarely reached. Such schemes are said to be "eventually-consistent" because synchrony across all nodes (consistency) would eventually be reached if new data were to stop being introduced and pairwise updates were to continue for a sufficiently long time.

A significant difficulty in layering application logic on top of eventually-consistent data propagation schemes is that data items may arrive in different orders at different nodes in the network. Unless the application state transitions are "commutative", results will be order-dependent. Usually, application logic cannot be written in a commutative form, and it is not acceptable for nodes to disagree on the application state in the long run, resulting in an "ordering problem".

Conventionally, the ordering problem is solved by having the application logic support a "merge" operation that can reconcile application states (differing application states are sometimes known as "conflicts"). Implementing a merge operation imposes a substantial cost burden during the development phase and the resulting program code may harbor hard-to-find bugs, as it is difficult to develop test scenarios that exercise concurrent writes sufficiently thoroughly to explore all possible inconsistencies that may arise during real-world operation.

In particular, a prior-art system for distributed data management known as "Bayou", takes the approach of requiring application logic to contain code that can perform merge operations for resolving conflicted application states. Bayou networks elect a distinguished "master node" that generates and distributes to other nodes an "official history" that is a specific ordering of all writes that become known to the master node.

Bayou uses "undo logging" to facilitate write reordering. Undo logging is a mechanism for rolling back database record updates or file write sets that cannot be allowed to complete due to the detection of conflicts with the updates and writes of concurrently-executing processes. Bayou uses undo logging to facilitate write reordering.

In Bayou, each node may apply any writes "tentatively" as soon as the writes are discovered by the node, but nodes that have applied tentative writes may be required later to undo them and reapply all writes in an order consistent with the official history. The writes that may be undone represent modifications of a tuple store provided to the application by the Bayou system.

Bosneag and Brockmeyer's paper "A Formal Model for Eventual Consistency Semantics" discusses techniques for efficiently rearranging other nodes' write histories in the manner of Bayou, by avoiding reordering in cases where the order can be mechanically determined not to matter. These features are dependent on correct dependency information being provided to the system.

SUMMARY OF THE INVENTION

In accordance with a first embodiment a computer-implemented method for eventually-consistent data stream consolidation comprises associating an application-generated undo record with each packet and supplying undo records to the application in order to rewind the application state prior to effecting a merge operation on the packet stream. Additionally, in accordance with a second embodiment, read requests for packet data are serviced. Additionally, in accordance with a third embodiment, redo records are maintained for optimizing replay.

BRIEF DESCRIPTION OF THE DRAWINGS

The present invention will be readily understood by the following detailed description in conjunction with the accompanying drawings, in which.

DETAILED DESCRIPTION OF THE INVENTION

Figure 1:
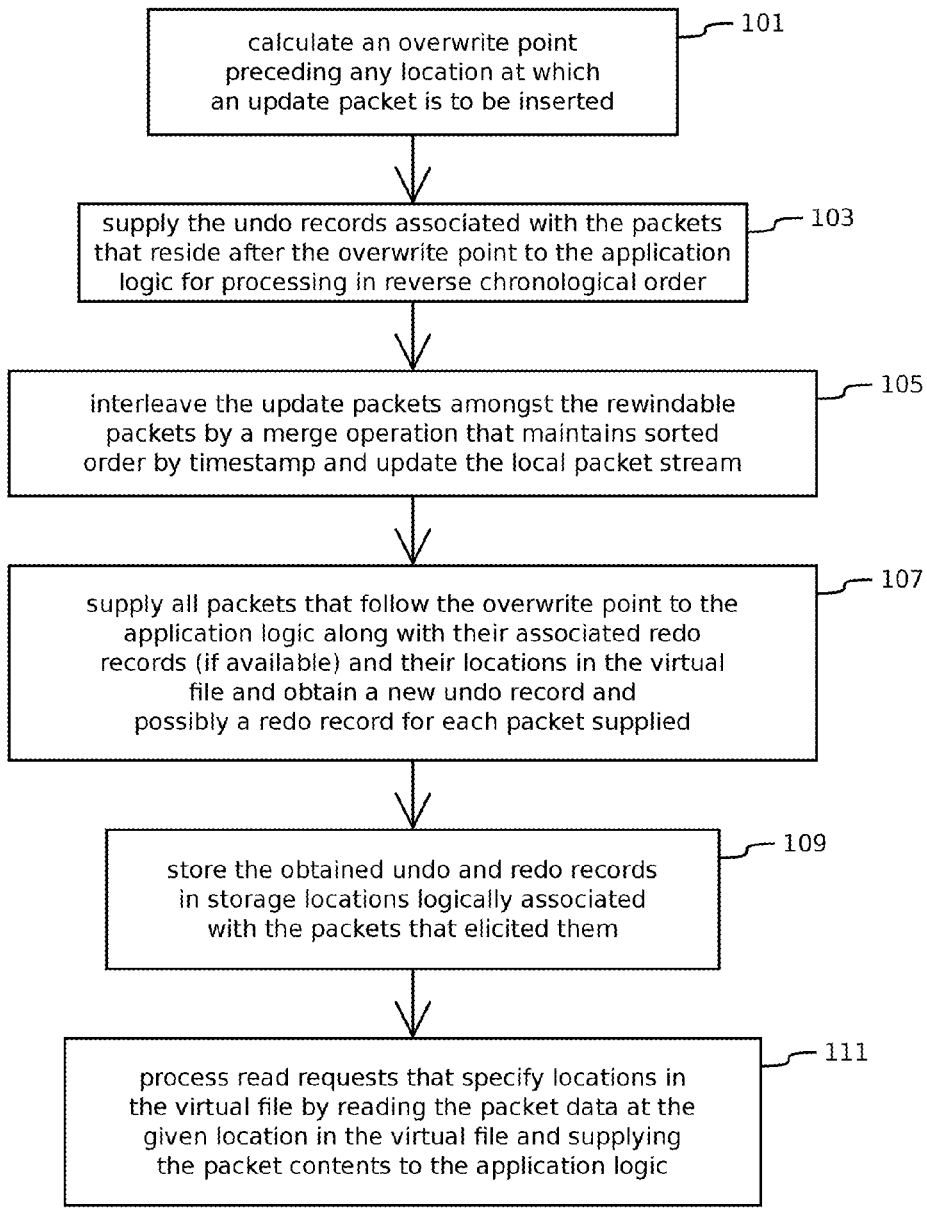
FIG. 1 shows a flowchart that is in accordance with the first, second and third embodiments.
Figure 2:
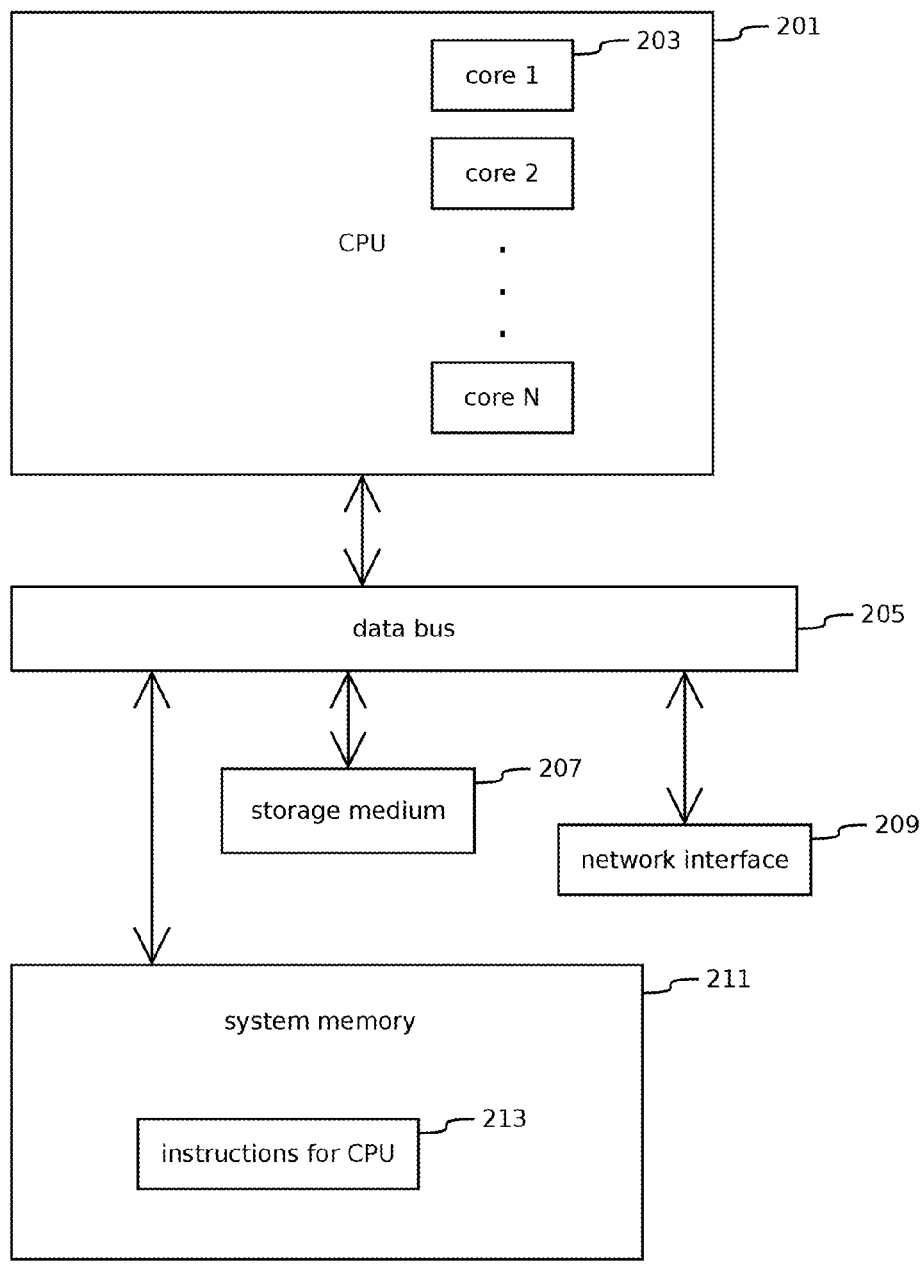
FIG. 2 shows the fourth embodiment, a computer implementation of the first, second and third embodiments.

The present invention, when implemented correctly, provides a data stream consolidation scheme that reduces the effort required to develop applications that require distributed storage.

In accordance with the first embodiment, all data entering the storage system is in a packet stream format. For the purposes of this specification, a "packet" is a data item containing a predetermined number of bytes, or a variable number of bytes. Many data sources are most naturally viewed as packet streams; for example, the encodings of "events" or "user actions" that drive a dynamic website.

Packets are said to form a "stream" from a data source because the data source is expected to generate new packets from time to time. If all packets were known in advance, much more efficient information processing and retrieval methods could be used to process them. A packet "stream" is a list of packets whose order matters and into which new packets may enter from time to time. The oldest packets in the stream may be discarded from time to time. New packets need not be introduced exclusively at the end of the packet stream, however. New packets may be introduced anywhere, but are expected to be introduced near the end of the packet stream.

A data source that is not already a packet stream may usually be readily converted to packet stream format by aggregating data bytes into a packet until an "interruption" condition is met, and then issuing that packet and commencing aggregation into a new packet.

The interruption condition may be the occurrence of any of a set of interruption criteria. An interruption criterion may be that a maximum packet size has been reached, or that a maximum data delay interval has been reached, or that a natural delimiter (such as file or record separator) has been encountered in the data stream.

In accordance with the first embodiment, packets represent a means for providing "input" to the application logic. At a given time on a given node of the distributed system, the application logic has "processed" or "incorporated" a certain list of packets into its application state. In other words, the application state is the combined effect of all "processed" packets.

In accordance with the first embodiment, every packet in the data stream contains a timestamp or has a timestamp associated with it. At various stages in the operation of the embodiment, packets will be ordered (sorted) by timestamp.

Timestamps may be generated in a wide variety of suitable manners, provided that the timestamp values are generally increasing. It is possible (and fully equivalent) to work with timestamps that decrease; i.e., timestamps that represent a countdown towards an event in the very distant future.

One possibility for timestamp generation is to use the output of a real-time clock. Another possibility is to use a networked timestamp generation scheme widely known in the prior art such as a "Lamport clock". Other timestamp generation schemes are possible and it is an advantage of the present invention that it may be used with virtually any reasonable timestamp generation method.

For the purposes of specificity, one particular way of implementing a Lamport clock is to output either the value of a real-time clock, or a value one greater than the highest clock portion of the timestamp of any known packet, whichever is greater. By this method, the clock values will tend to increase monotonically. This is so even if the nodes' real-time clocks are not synchronized, as long as nodes frequently obtain update packets from peers. In the case of poorly synchronized clocks, the clock values will tend to approximate the time kept by the node whose clock runs fastest.

As previously stated, the first embodiment specifies the association of a timestamp with every packet. It is an advantage for timestamps to be unique, because this allows packets to be ordered (sorted) by considering the timestamp values only. A non-unique timestamp may be made unique by combining it with the packet checksum and allowing the packet checksum to act as a tie-breaker for determining the relative order of packets with equal timestamps. Alternatively, a non-unique timestamp may be made unique by combining it with a randomly chosen value from a sufficiently large range of possible values to preclude the possibility of collisions.

Packet checksums may be calculated by applying a collision-resistant hash function to the packet data. One possibility for a collision-resistant hash function, well known in the prior art, is SHA-256. The output of the collision-resistant hash function may be truncated (shortened) to consume less space at the cost of a slightly higher probability of collisions.

Instead of combining clock values with checksums or other pseudo-randomly generated data, it is possible to consider the entire packet content as an extension of the timestamp and order packets with identical timestamps lexicographically by the byte values of the packets' contents. This may be expected to provide a slight storage saving at the cost of consuming slightly more CPU time.

In accordance with the first embodiment, each node onto which data is to be distributed maintains a list of packets sorted in the order of increasing (that is, chronologically subsequent) timestamps. The list of packets may be stored in a "virtual file", a term that will be used to refer generically to a storage target allowing coarse-grained blocks to be read and written. The virtual file may be a file or a set of files stored on a file system. Alternatively, the virtual file may be a hard disk drive or logical partition thereof. The virtual file may be a network drive or a logical partition thereof.

There are a variety of possibilities with regards to the details of storing packets in the virtual file. The packets may be stored directly in sorted order, or they may be stored in a different order and a separate "index" data structure may enumerate the packet locations in order of increasing or decreasing packet timestamp. In particular, it may be appropriate, in some circumstances, to store packets in the order of their discovery by the particular node controlling the virtual file.

As will be seen, it will be necessary to reorder packets from time to time using merge operations to keep the packet stream in sorted order. At the present time, it seems preferable to store packets in sorted order if the average packet size is expected to be relatively small and packets and can therefore be relocated without requiring excessive copying operations, and to store packets in the order of their discovery if very long messages are to be permitted.

Alternatively, packets shorter than a predetermined threshold may be stored in the sorted packet stream, and a placeholder pseudo-packet may be generated for packets longer than the threshold. The placeholder pseudo-packet may be stored in the sorted packet stream, and may indicate a storage location at which the packet data may be read. Thus, sorted order may be maintained efficiently without excessive copying of long packets, since only the placeholder pseudo-packet participates in the rearrangement operations. Of course, the additional lookup required to produce the packet data will increase the latency for accessing the packet data (thus the threshold value should not be set very low).

In accordance with the first embodiment, each node stores an "undo" record for each packet. The data contained in the undo record is generated by the application logic as it processes each packet and may represent a recipe for returning the application logic to the state it was in before processing that packet. The undo record will be said to have been "elicited" by the packet that was processed to generate it. Each undo record may be stored in a storage location logically associated with the packet that elicited it.

For example, a portion of the application logic of a website may deal with maintaining user passwords. If, in such an application, a packet has the effect of changing the password of a particular user referred to as U to a value referred to as B, and the packet is processed at a time at which the password of user U is a value referred to as A, the undo record for that packet may represent setting the password of user U back to the previous value A. The value A is encoded as a part of the undo record; the undo record for a packet varies depending on the application state.

The preceding examples are merely intended to illustrate the typical function of an undo record, and is not intended to limit the scope of the invention in any way.

The undo record associated with a packet may be stored in a location in the virtual file approximately preceding or approximately following the location where the packet data is stored. Alternatively, all undo record data may be stored separately from packet data, and the location of an associated undo record may be stored in proximity of the packet data or in the index data structure.

In accordance with the first embodiment, each node of the storage system synchronizes packet streams with other ("peer") nodes. The term "update protocol" will be used to refer to the synchronization mechanism for obtaining previously undiscovered packets from a peer node. More specifically, the packets obtained from the update protocol will be referred to as "update packets", as it may not be immediately determined whether or not the obtained packets have been previously discovered by the current node.

Many update protocols are possible, and it is not intended for the invention to be limited to any particular update method. It is an advantage of the present invention that it may be used with virtually any update protocol. Many update protocols are known in the prior art. For the purposes of specificity, Merkle trees may be used to isolate differences in the sorted packet streams.

As packets can easily be enumerated or listed in sorted order on any node, update packets are expected to be provided from the sending node to the receiving node in sorted order. As will be seen, this will allow the update packets to be "merged" into the local packet stream efficiently. If, due to the choice of update protocol, the update packets are not guaranteed to arrive in sorted order, they may be sorted before performing the merge operation.

To improve efficiency, a scheduler may be employed to aggregate several sets of update packets from interactions with multiple peer nodes, increasing the size of the set of update packets (and, therefore, the relative density of the update packets, which may be considered as an efficiency metric).

Pairwise merging of update packet sets may be performed in the manner of the mergesort algorithm. The smallest pairs of update packet sets may be repeatedly merged until only a single packet set remains. Alternatively, an N-way merge be effected to merge all update packet sets in one pass, perhaps using a binary heap or other heap or binary search tree data structure to repeatedly select the smallest packet from any update packet set.

The scheduler may also postpone the merging of packets with more outdated timestamps. As will be seen, merging packets with earlier timestamps requires rewinding more previously processed packets; in this light, it may improve efficiency to hold off deep merge operations in case additional packets with outdated timestamps arrive.

Many schemes for merging and postponing packet sets are possible, and it is not intended for the invention to be limited to any particular scheme for scheduling update packet sets. It is an advantage of the present invention that it may be used with virtually any scheme for scheduling update packet sets.

For the purposes of specificity, a rudimentary scheduler may repeatedly merge the union of all update packet sets that have arrived and pause for a predetermined interval of time, such as one second.

In accordance with the first embodiment, an "overwrite point" for a set of update packets is calculated (101) as the point in the virtual file immediately preceding the earliest location in the sorted packet stream at which a new packet is to be inserted.

The overwrite point may be readily calculated by first determining the earliest timestamp of any update packet, and then iterating in reverse sorted order through the packets stored in the virtual file, until a packet with a yet earlier timestamp is found. The "overwrite point" is then immediately subsequent this stored packet. Binary search may be used, but would not accelerate the calculations significantly (the subsequent merge operation requires anyways effort that is proportional to the amount of data subsequent to the overwrite point).

Alternatively, the overwrite point may be set to any point in the file preceding the earliest location in the sorted packet stream at which a new packet is to be inserted. This may be more convenient if the update protocol can generate a usable value without additional calculation. However, setting the overwrite point accurately may improve efficiency.

Before merging, the undo records associated with packets after the overwrite point are supplied (103) to the application logic for processing in reverse chronological order. This is expected to have the effect of returning the application logic to a state corresponding to having processed only packets prior to the overwrite point. Informally, this has the effect of "rewinding" the application state to a previous state incorporating only information derived from packets prior to the overwrite point. In the flowchart drawings, packets after the overwrite point are referred to as "rewindable".

In accordance with the first embodiment, a merge operation is performed in which update packets are interleaved (105) amongst the local packets after the overwrite point. Such interleaving may involve rearranging the packet data itself, or manipulations of a packet index only. The update packets are inserted at appropriate points in the packet stream such that the packet stream remains sorted by timestamp.

The join step of the merge sort algorithm is appropriate for obtaining a single output sorted packet list combining two separate input sorted packet lists. One of the input sorted packet lists may be the portion of the node's packet stream subsequent to the overwrite point and the other input sorted packet list may be the list of update packets. Duplicates are readily eliminated from such a packet list as multiple occurrences of the same packet would occupy adjacent entries in the output sorted packet list.

During or after the merge operation, each packet of the merged packet stream is supplied (107) to the application logic so that it may update the application state and generate a new undo record for each packet, which is stored (109).

Those skilled in the art will appreciate that the preceding specification of the first embodiment allows maintenance of a consistent application state while consolidating packet data streams from multiple source nodes.

It should be noted that, during the operation of the first embodiment, a particular packet may be supplied to the application logic for processing in a plurality of instances. As additional packets with earlier timestamps are discovered, it becomes necessary to merge them ahead of previously discovered packets with later timestamps, so the application logic may be required to undo and re-process the same packet multiple times.

In accordance with the second embodiment, each node may, in addition to following the specification of the first embodiment, process (111) read requests specifying locations in the virtual file by reading the packet data at the given location in the virtual file and supplying the packet contents to the application logic.

The location of each packet in the virtual file is supplied (109) to the application logic along with the packet contents during or after the merge operation.

Thus the application logic component not need to store all packet data in application memory, but may selectively load specific data as needed. It is envisioned that applications may store in memory only pieces of information that are required to make real-time decisions (such as whether a given username and password combination should be result in successful login) and rely on storage in the virtual file for data that is primarily destined for non-real-time background processing, or for simple retrieval at future times without processing (such a user's profile image).

The preceding examples are merely intended to illustrate the typical use of read requests, and are not intended to limit the scope of the invention in any way.

In accordance with the third embodiment, each node may, in addition to following the specification of the first embodiment, store an optional "redo" record for each packet, to facilitate rapid re-processing ("replay") of the packet. The redo record may be generated by the application logic at its option. The redo record may be generated by the application logic as it processes each packet and may represent an accelerated recipe for moving the application logic from an arbitrary state prior not incorporating changes indicated by that packet to an application state subsequent to processing that packet. The redo record will be said to have been "elicited" by the packet that was processed to generate it.

For example, a portion of the application logic of a website may deal with automated quality ratings of uploaded documents. If, in such an application, a packet has the effect of adding a document to the pool of uploaded and rated documents, the rating of the document may be stored in a redo record after it is calculated the first time. If the automated rating of each document is independent of other documents, there is no possible effect to it as a result of a merge operation that would change the set of documents processed in advance of the current document. In computer science jargon, the rating is said to be "cached" in the redo record to avoid unnecessary recalculation.

Broadly speaking, a redo record may be utilized by the application to store a parsed (ready-for-processing) version of packet and any data the can be precalculated from the packet data without reference to the application state.

The preceding examples are merely intended to illustrate the typical function of a redo record, and is not intended to limit the scope of the invention in any way.

The redo record associated with a packet may be stored in a location in the virtual file approximately preceding or approximately following the location where the packet data is stored. Alternatively, all redo record data may be stored separately from packet data, and the location of an associated redo record may be stored in proximity of the packet data or in the index data structure.

The additional features of the second and third embodiments are not incompatible, and may be combined trivially to provide comprehensive functionality.

In accordance with the fourth embodiment, an apparatus comprises a CPU (201), also known as a "central processing unit", having at least one processing core (203), and being communicatively connected, by means of a data bus (205), to a system memory (211), to a storage medium (207) and to a network interface (209). The system memory (211) comprises instructions (213) for the CPU. The hardware devices of a CPU, a processing core, a data bus, a system memory, a storage medium and a network interface are known in the prior art. The system memory may be DRAM memory. The storage medium may be a hard disk drive, a solid state drive or other hardware component providing data block storage means. System memory, DRAM memory, operating system, hard disk drive, network interface are hardware and software devices known in the prior art.

In the fourth embodiment, the improvement lies in the instructions (213) for the CPU, which are formulated to implement the methods described in the first, second and third embodiments.

In the fourth embodiment, the virtual file may be contained in the storage medium (207) or may be stored on a network drive accessed through the network interface (209). Parts of the virtual file may be cached in the system memory (211) for efficiency, perhaps utilizing the operating system's page cache by establish a memory mapping of the device or file backing the virtual file.

There are many possibilities with regard to the specifics of carrying out the communication with the application logic that is required for proper implementation the previously described embodiments. The necessary communication includes supplying a packet to be processed (and possibly supplying a redo record, if available), obtaining an undo record, possibly obtaining a redo record, obtaining a request to read a portion of the virtual file and providing the result of reading a portion of the virtual file.

To achieve communication with the application logic component, the embodiment may be a source code library or a shared object library that may be loaded into the application logic and communicate with it using function calls or method invocations. Alternatively, the embodiment may be a stand-alone software application and utilize one end of a named or anonymous pipe, TCP connection, or other duplex streaming data transfer protocol and thereby communicate with the application logic component. Alternatively, the embodiment and application logic may communicate using shared memory. Many other possibilities for arranging suitable communication between the embodiment and the application logic component exist, and it is not intended for the invention to be limited to the specific means previously recited.

CONCLUSION, RAMIFICATIONS, AND SCOPE

From the description above, a number of advantages of some embodiments become evident, including, most importantly, that they allow maintenance of an eventually-consistent distributed application state without requiring the application developer to implement a merge function.

Rather than implementing a merge function, the application developer is required to implement an undo function. In practice, undo functions are easier to develop and test than merge functions. A software engineer can more easily gain a good understanding of a distributed application that is designed to retrace its steps back to a forking point, rather than one that is designed to blend forked application states.

Moreover, the generation of undo information can be mechanized in some cases. For example, the "ManagedApplication" module in the sample program listing mechanizes the maintenance of a hash table. This fully insulates the software engineer from the distributed nature of the application; the software engineer may pretend that they are writing an application intended to execute as a single instance.

it should be noted that the mechanization achieved in the sample program listing is not fool-proof, and can be defeated by modifying the contents of objects previously placed in the hash table rather than making changes through complete replacement of hash table mappings (the expected usage). Nevertheless, a software engineer bearing this limitation in mind can achieve fairly trouble-free distributed computing.

Simple modifications (such as "freezing" the objects being inserted into the hash table and restricting them to readily-serializable types such as integer values, strings, and arrays) may yield substantial improvements with regard to fool-proofing the "ManagedApplication" module.

Straightforward crash recovery involves starting with a blank-slate application state and feeding each packet in the packet stream to the application logic, so that it may "catch up" to the current state. Performing crash recovery in such a manner is disadvantageous, because it may take a long time for the application logic to process the entire packet history. Therefore, the application state may be checkpointed periodically. For this purpose, a straightforward solution would be for the application logic to provide an application state dump function and an application state load function.

The application state dump function may be invoked periodically (or when the system is directed to perform a checkpoint by a system administrator) and the results saved to persistent storage. During crash recovery, the application checkpoint data may be loaded from persistent storage and supplied to the application logic's state load function.

It should be noted that packets need not be stored indefinitely on every node. Packets may be discarded if three independent conditions are all satisfied. Firstly, the application may signal that it is no longer interested in reading the packet's contents. This may occur when the packet's contents relate to data that will never be required in the future, such as, for example, the contents of a deleted user profile. Secondly, the packet's timestamp may be sufficiently outdated such that it is unlikely that any packet discovered in the future will have a yet older timestamp (a situation that would require rewinding past the packet, which would be impossible had the packet been discarded). Thirdly, a valid application state checkpoint incorporating the packet state may exist.

Although the description above contains many specificities, these should not be construed as limiting the scope of the embodiments but as merely providing illustrations of some the presently preferred embodiments. Since numerous modifications and changes will readily occur to those skilled in the art, it is not desired to limit the invention to the exact construction and operation as illustrated and described. Hence, all suitable modifications and equivalents may be resorted to as falling within the scope of the invention.

The invention claimed is:

1. A computer-implemented method for updating the state of an application logic to reflect a plurality of update packets entering a local packet stream, each of said plurality of update packets having a packet timestamp, said local packet stream comprising a first plurality of local packets, each of said first plurality of local packets having a packet timestamp, the method comprising:
   (a) calculating an overwrite point, said overwrite point calculated to precede any location in said local packet stream at which one of said plurality of update packets is to be inserted;
   (b) supplying, to said application logic, a first plurality of undo records, each of said first plurality of undo records having previously been elicited by one of a second plurality of local packets, each of said second plurality of local packets being after said overwrite point in said local packet stream;
   (c) executing a merge operation, said merge operation interleaving said plurality of update packets amongst said second plurality of local packets, said merge operation arranging packets in order of increasing packet timestamp, said merge operation eliminating duplicate packets, said merge operation resulting in an updated local packet stream comprising a third plurality of local packets;
   (d) supplying, to said application logic, a fourth plurality of local packets, each of said fourth plurality of local packets being one of said third plurality of local packets, each of said fourth plurality of local packets being after said overwrite point in said updated local packet stream;
   (e) obtaining, from said application logic, a second plurality of undo records, each of said second plurality of undo records having been elicited by one of said fourth plurality of local packets.

2. The method of claim 1, wherein each packet timestamp is calculated as a combination of a clock value and a packet checksum.

3. The method of claim 2, wherein said clock value is the output of a Lamport clock, and said packet checksum is obtained by applying a collision-resistant hash function to the contents of a packet.

4. The method of claim 1, wherein and the method further comprises:
   (a) storing each of said second plurality of undo records in an undo record storage location logically associated with the packet that elicited the undo record.

5. The method of claim 4, wherein said first plurality of local packets is stored in a virtual file and the method further comprises:

(a) supplying, to said application logic, a list of virtual file offsets, each of said list of virtual file offsets indicating the location, in said virtual file, of one of said fourth plurality of local packets;

(b) supplying, upon receiving a read request from said application logic, to said application logic, a packet, said read request incorporating a virtual file offset, said packet being loaded from said virtual file offset of said virtual file.

6. The method of claim 5, wherein each packet timestamp is calculated as a combination of a clock value and a packet checksum.

7. The method of claim 6, wherein said clock value is the output of a Lamport clock, and said packet checksum is obtained by applying a collision-resistant hash function to the contents of a packet.

8. The method of claim 5, wherein the method further comprises:

(a) supplying, to said application logic, a first plurality of redo records, each of said first plurality of redo records having previously been elicited by one of said fourth plurality of local packets;

(b) obtaining, from said application logic, a second plurality of redo records, each of said second plurality of redo records being elicited by one of said fourth plurality of local packets;

(c) storing each of said second plurality of redo records in a redo record storage location logically associated with the packet eliciting the redo record.

9. The method of claim 1, wherein the method further comprises:

(a) supplying, to said application logic, a first plurality of redo records, each of said first plurality of redo records having previously been elicited by one of said fourth plurality of local packets;

(b) obtaining, from said application logic, a second plurality of redo records, each of said second plurality of redo records being elicited by one of said fourth plurality of local packets;

(c) storing each of said second plurality of redo records in a redo record storage location logically associated with the packet eliciting the redo record.

10. The method of claim 1, wherein said first plurality of local packets is stored in a virtual file and the method further comprises:

(a) supplying, to said application logic, a list of virtual file offsets, each of said list of virtual file offsets indicating the location, in said virtual file, of one of said fourth plurality of local packets;

(b) supplying, upon receiving a read request from said application logic, to said application logic, a packet, said read request incorporating a virtual file offset, said packet being loaded from said virtual file offset of said virtual file.

11. The method of claim 10, wherein the method further comprises:

(a) supplying, to said application logic, a first plurality of redo records, each of said first plurality of redo records having previously been elicited by one of said fourth plurality of local packets;

(b) obtaining, from said application logic, a second plurality of redo records, each of said second plurality of redo records being elicited by one of said fourth plurality of local packets;

(c) storing each of said second plurality of redo records in a redo record storage location logically associated with the packet eliciting the recto record.

12. An apparatus for updating the state of an application logic to reflect a plurality of update packets entering a local packet stream, each of said plurality of update packets having a packet timestamp said local packet stream comprising a first plurality of local packets, each of said first plurality of local packets having a packet timestamp, said apparatus comprising:

(a) a CPU, said said CPU having at least one processor core;

(b) a network interface, said network interface being communicatively connected to said CPU, said network interface having previously received said plurality of update packets from a remote computer;

(c) a system memory, said system being communicatively connected to said CPU, said system memory storing a plurality of instructions, said plurality of instructions configuring said CPU for:

(1) calculating an overwrite point, said overwrite point calculated to precede any location in said local packet stream at which one of said plurality of update packets is to be inserted;

(2) supplying, to said application logic, a first plurality of undo records, each of said first plurality of undo records having previously been elicited by one of a second plurality of local packets, each of said second plurality of local packets being after said overwrite point in said local packet stream;

(3) executing a merge operation, said merge operation interleaving said plurality of update packets amongst said second plurality of local packets, said merge operation arranging packets order of increasing packet timestamp, said merge operation eliminating duplicate packets said merge operation resulting in an updated local packet stream comprising a third plurality of local packets;

(4) supplying, to said application logic, a fourth plurality of local packets, each of said fourth plurality of local packets being one of said third plurality of local packets each of said fourth plurality of local packets being after said overwrite point in said updated local packet stream;

(5) obtaining, from said application logic, a second plurality of undo record each of said second plurality of undo records having been elicited by one of said fourth plurality of local packets.

13. The apparatus of claim 12, wherein said plurality of instructions further configure said CPU for:

(1) storing each of said second plurality of undo records in an undo record storage location logically associated with the packet that elicited the undo record.

14. The apparatus of claim 13, wherein said first plurality of local packets is stored in a virtual file and said plurality of instructions further configure said CPU for:

(1) supplying, to said application logic, a list of virtual file offsets, each of said list of virtual file offsets indicating the location, in said virtual file, of one of said fourth plurality of local packets;

(2) supplying, upon receiving a read request from said application logic, to said application logic, a packet, said read request incorporating a virtual file offset, said packet being loaded from said virtual file offset of said virtual file.

15. The apparatus of claim 14, wherein each packet timestamp is calculated as a combination of a clock value and a packet checksum.

16. The apparatus of claim 15, wherein said clock value is the output of a Lamport clock, and said packet checksum is obtained by applying a collision resistant hash function to the contents of a packet.

17. The apparatus of claim 14, wherein said plurality of instructions further configure said CPU for:
(1) supplying, to said application logic, a first plurality of redo records, each of said first plurality of redo records having previously been elicited by one of said fourth plurality of local packets;
(2) obtaining, from said application logic, a second plurality of redo records, each of said second plurality of redo records being elicited by one of said fourth plurality of local packets;
(3) storing each of said second plurality of redo records in a redo record storage location logically associated with the packet eliciting the redo record.

\* \* \* \* \*